United States Patent [19]
Nielsen

[11] Patent Number: 6,006,333
[45] Date of Patent: Dec. 21, 1999

[54] PASSWORD HELPER USING A CLIENT-SIDE MASTER PASSWORD WHICH AUTOMATICALLY PRESENTS THE APPROPRIATE SERVER-SIDE PASSWORD TO A PARTICULAR REMOTE SERVER

[75] Inventor: Jakob Nielsen, Atherton, Calif.

[73] Assignee: Sun Microsystems, Inc., Palo Alto, Calif.

[21] Appl. No.: 08/615,660

[22] Filed: Mar. 13, 1996

[51] Int. Cl.$^6$ .................................................. G06F 12/14
[52] U.S. Cl. ........................... 713/202; 713/201; 709/203
[58] Field of Search ........................... 395/187.01, 200.5, 395/188.01, 200.33; 380/25; 713/202, 207; 709/220, 203

[56] References Cited

U.S. PATENT DOCUMENTS

| 5,481,720 | 1/1996 | Loucks | 395/187.01 |
| 5,560,008 | 9/1996 | Johnson | 395/680 |
| 5,611,048 | 3/1997 | Jacobs | 395/188.01 |
| 5,623,637 | 4/1997 | Jones | 395/491 |
| 5,642,515 | 6/1997 | Jones | 395/727 |
| 5,655,077 | 8/1997 | Jones | 395/187.01 |

OTHER PUBLICATIONS

Windows NT Resource Guide ISBN 1–55615–653–7, pp. 31–43, 1995.
Windows NT Networking Guide ISBN 1–55615–656–1, pp. 53–78, 1995.
Inside Windows NT, H. Custer, ISBN 1–55615–481–X pp.321–326, 1993.
The UNIX Programming Environment, Kernighan & Pike, ISBN 0–13–937681–X, pp. 52–53.
Microsoft Windows 95 Operating System, Microsoft Corp. (original retail release), Aug. 1995.
Microsoft Windows 95 Resource Kit, Microsoft Press, ISBN 1–55615–678–2, Chapter 11, 1995.
RFC 1510: The Kerberos Network Authenication Service (V5), Kohl, J., Sep. 1993.

*Primary Examiner*—John W. Cabeca
*Assistant Examiner*—Christopher S. Chow
*Attorney, Agent, or Firm*—Townsend and Townsend and Crew LLP

[57] ABSTRACT

A user operating a client system may access a plurality of remote servers requiring passwords for access by employing a master password. The master password is used to decrypt a stored password for a particular remote server to which the client desires access. The client system maintains a database of encrypted passwords and user IDs for remote servers to which the user is registered. Although each remote server is accessed using a different password, the user need only remember one master password. Since only the master password need be remembered, the passwords particular to specific remote sites may be made more random and thus more secure. Implementation of the password management system need not require modification of any remote servers.

12 Claims, 5 Drawing Sheets

| URL | PASSWORD (ENCRYPTED) | USER ID (ENCRYPTED) |
|---|---|---|
| 202 | 204 | 206 |

FIG. 2.

PASSWORD HELPER USING A CLIENT-SIDE MASTER PASSWORD WHICH AUTOMATICALLY PRESENTS THE APPROPRIATE SERVER-SIDE PASSWORD TO A PARTICULAR REMOTE SERVER

BACKGROUND OF THE INVENTION

The present application relates to user authentication and more particularly to authenticating a user operating a client system to a plurality of remote servers, each of which requiring a password for authentication.

Many remotely accessible computer systems require user authentication. The user, presumably operating a client system, must be registered with the remote system and must type in his or her user ID and a password for that remote system every time it is accessed.

One problem presented by the need for user authentication is that if the user accesses multiple remote systems, the user must remember numerous passwords and user IDs. Typical users confronted with this problem will often try to use the same password for each remote system or write down a list of passwords.

Both of these makeshift solutions compromise security. If the same password is used for each remote system, a system administrator of one remote system will be able to obtain passwords usable to access other remote systems. A written list of passwords is an obvious breach of security in that anyone with access to the list will be able to access any of the remote systems.

The problem of authenticating a user to a plurality of remote systems has become particularly apparent in light of the proliferation of limited access sites on the World Wide Web (WWW). Before accessing a site, the user is presented with an authentication form generated by his or her WWW browser requesting a user ID and password. The user must register separately with each such site and maintain multiple passwords. Furthermore, when navigating through the WWW, he or she is frequently interrupted by authentication messages requesting a user ID and password.

One known partial solution is to remember the last user ID and password typed into a WWW browser's authentication form and provide these values as a default the next time the form is brought up. This facilitates navigation of the WWW for users who employ the same user ID and password for multiple sites since logging into subsequent sites after the first one can be done by simply accepting the default. Thus, the problem of interruption by authentication messages is partially ameliorated in that it is easy to respond to the messages. However, the security problem presented by using a common password for multiple sites remains.

What is needed is a convenient yet adequately secure system whereby a user may access multiple remote servers that require passwords.

SUMMARY OF THE INVENTION

By virtue of the present invention, a user operating a client system may access a plurality of remote servers requiring passwords for access by employing a master password. The master password is used to decrypt a stored password for a particular remote server to which the client desires access. In one embodiment, the client system maintains a database of encrypted passwords and user IDs for remote servers to which the user is registered. Since only the master password need be remembered, the passwords particular to specific remote sites may be made more random and thus more secure. Implementation of this password management system does not require modification of any remote servers.

In one embodiment, the remote servers are controlled access WWW sites. The client system, coupled to the remote servers via the Internet, includes a WWW browser. The WWW browser is extended in accordance with the invention to incorporate special capabilities for assisting the user with accessing WWW sites which require authentication. No modification to the remote servers is required in this embodiment.

A WWW browser modified in accordance with the invention may maintain a password database that includes entries holding the URL, encrypted user ID, and encrypted password for a plurality of remote sites. When a new browsing session begins, the WWW browser may prompt the user for the master password upon the start of a new browsing session and store it. Then, when an authentication request message is received from a remote site that the user is seeking to access, the browser scans the password database for the URL of that remote site. If an entry is found, the browser decrypts the password and user ID and forwards them to that remote site. This can all occur without presenting the usual authentication form to the user. For enhanced security, instead of storing the master password, the browser may prompt the user for it every time it is needed.

If the browser cannot find an entry for the URL of a remote site, control may be returned to the user for the purpose of registration. To update the database, the browser presents a screen for the user to enter the same password and user ID that he or she registers to the remote site. The browser may suggest a password, providing a higher level of security in that passwords generated by the user are often easily guessed. The password and user ID input by the user are then encrypted using the master password and stored in the database along with the URL of the remote site.

A further understanding of the nature and advantages of the inventions herein may be realized by reference to the remaining portions of the specification and the attached drawings.

BRIEF DESCRIPTION OF THE DRAWINGS

FIG. 2 depicts a table showing how password information may be stored in accordance with the present invention.

DESCRIPTION OF SPECIFIC EMBODIMENTS

Figure 1A:
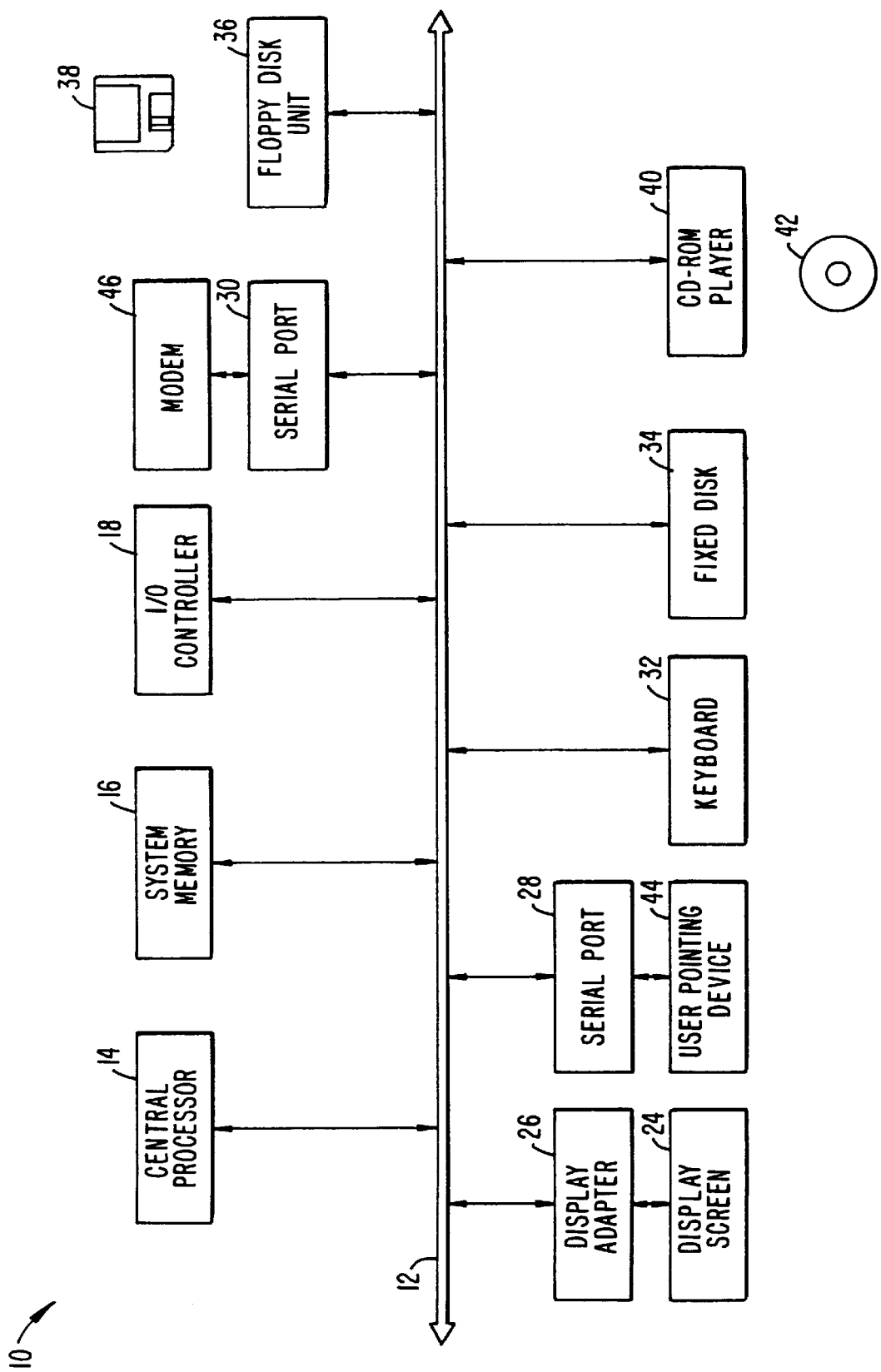
FIG. 1A depicts a block diagram of a client computer system suitable for implementing the present invention.

FIG. 1A depicts a block diagram of a client computer system 10 suitable for implementing the present invention. Client computer system 10 includes a bus 12 which interconnects major subsystems such as a central processor 14, a system memory 16 (typically RAM), an input/output (I/O) controller 18, an external device such as a display screen 24 via display adapter 26, serial ports 28 and 30, a keyboard 32, a fixed disk drive 34, a floppy disk drive 36 operative to receive a floppy disk 38, and a CD-ROM player 40 operative to receive a CD-ROM 42. Many other devices can be connected such as a mouse 44 connected via serial port 28 and a modem 46 connected via serial port 30. Modem 46 may provide a direct connection to a remote server via a telephone link or to the Internet via a POP (point of presence). Alternatively, some other type of network interface system (not shown) could be used.

Many other devices or subsystems (not shown) may be connected in a similar manner. Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention may be operably disposed in system memory 16 or stored on storage media such as fixed disk 34 or floppy disk 38.

Figure 1B:
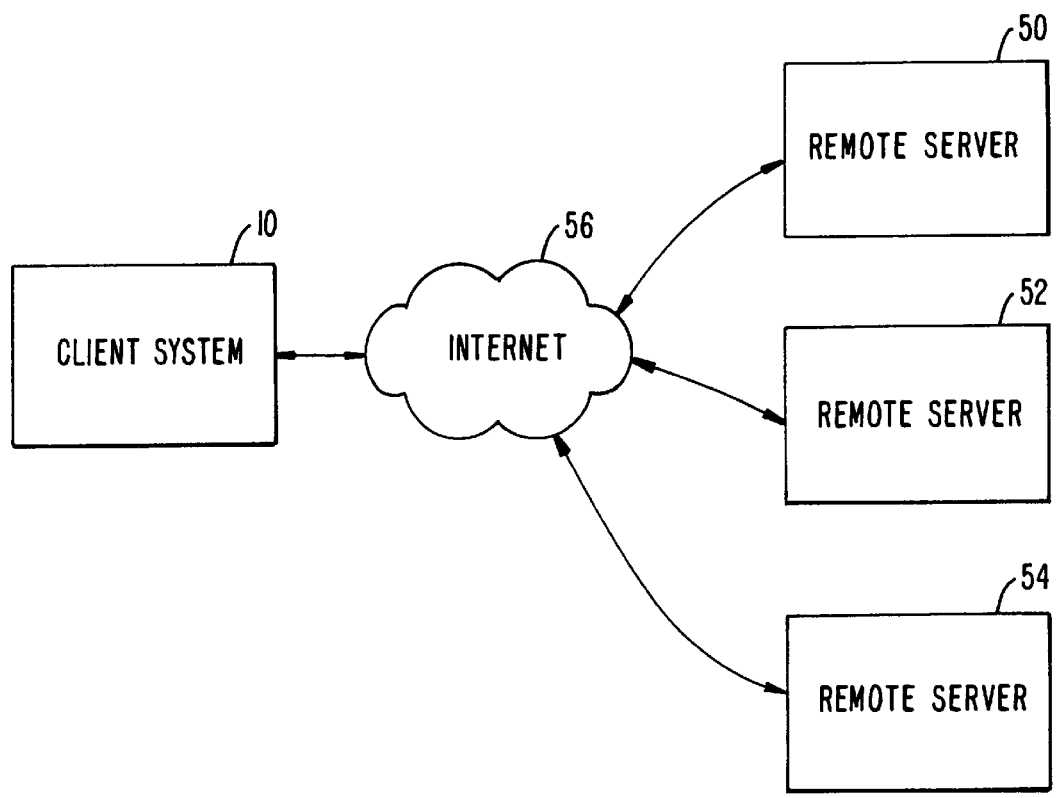
FIG. 1B depicts the interconnection of the client computer systems to remote servers.

FIG. 1B depicts the interconnection of client computer system 10 to remote servers 50, 52, and 54. FIG. 1B depicts the Internet 56 interconnecting remote servers 50, 52, and 54. Modem 42 or some other network interface provides the connection from client computer system 10 to the Internet 56. Protocols for exchanging data via the Internet are well known and need not be discussed herein. Although FIG. 1B depicts the use of the Internet for exchanging data, the present invention is not limited to the Internet.

One well-known application of the Internet is the World Wide Web (WWW). Remote servers 50, 52, and 54 may each provide access to a web site. To access WWW documents available on remote servers 50, 52, and 54, client computer system 10 operates a special browser program. One preferred browser used for this purpose is HotJava™, a browser available from Sun Microsystems™.

The web sites at remote servers 50, 52, and 54 may be controlled access web sites. Whenever a user operating client computer system 10 attempts to access a controlled access web site, the web site forwards a request for authentication to client computer system 10. Typically, the browser will respond to the authentication request by displaying an authentication form having entry fields for entering a password and a user ID. After receiving input specifying the user ID and password, the browser forwards this information to the web site. If the password and user ID information are correct, the user is permitted access to the web site. Controlled access web sites are usually structured to include a page that permits the user to register to the site by providing a password and user ID to be used in later accesses.

The present invention provides a system for managing password access to a plurality of remote servers such as remote web sites. This password management system is preferably implemented as an applet, e.g., a segment of executable computer code downloadable from a network and executed as part of a larger program, to be used in conjunction with HotJava® or other Java-enhanced browsers. Of course, the password management features of the present invention could also be directly incorporated into a browser program. The remote servers need not be modified to provide these features.

In accordance with the present invention, a user operating client computer system 10 need only remember a single master password that will be used to access many remote servers. The password management system of the present invention maintains a database of passwords and user IDs as they are known to the remote sites. This information is encrypted using the master password. When a request for authentication is received, the system intercepts the request, inhibiting the browser from displaying the usual authentication form, decrypts the needed password and user ID using the master password, and forwards the decrypted password and user ID to the requesting remote site. The remote site receives the decrypted password and user ID in the same way it would if this information had been input into the usual authentication form at client computer system 10.

FIG. 2 depicts a table 200 showing how password information may be stored in accordance with the present invention. A table is stored having a separate entry for each of a plurality of controlled access web sites. Each entry includes a network address 202 of the web site, typically represented as the Universal Resource Locator (URL) which specifies the site access protocol and name of the site, e.g., "http://www.sun.com." In contexts other than the WWW, some other address might be used. Each entry further includes the user ID 206 and password 204 used to log into that site. At least the password, and preferably also the user ID are encrypted using a master password as the encryption key. The particular encryption scheme and accompanying decryption scheme used are not important to the present invention. One example of a usable encryption scheme is DES. The password database of FIG. 2 is preferably stored on fixed disk drive 34.

Figure 3:
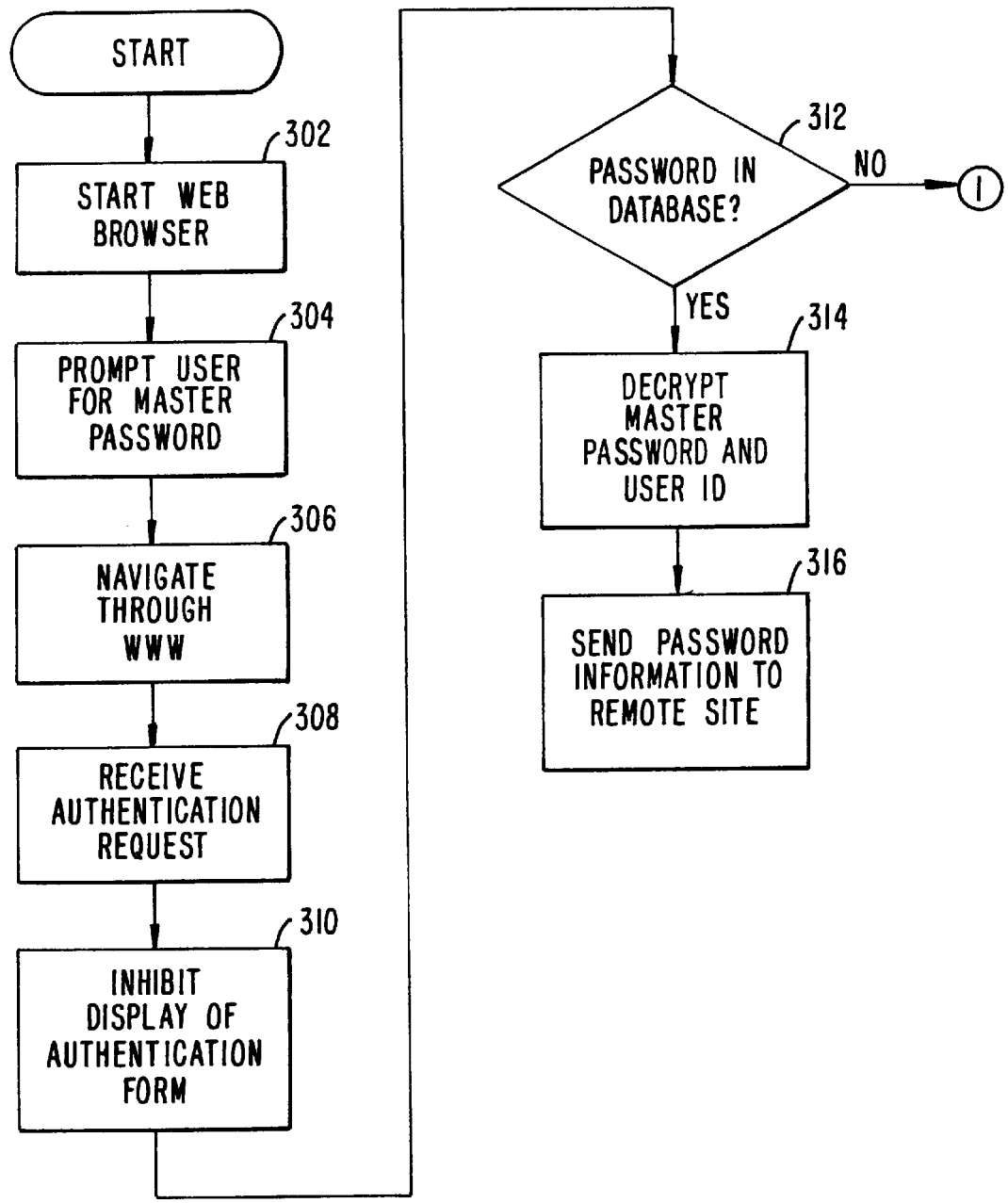
FIG. 3 is a flowchart depicting how a user may be authenticated to a remote site in accordance with the present invention.

FIG. 3 is a flowchart depicting how a user may be authenticated to a remote site in accordance with the present invention. The user begins a web browsing session by starting the web browser at step 302. Preferably, the password management system of the present invention then prompts the user at step 304 for a master password which is stored in system memory for later use in encryption and decryption of the password information stored in the database of FIG. 2.

For enhanced security, the user can choose by, e.g., setting a preference, to never store the master password and step 304 is skipped. Instead, the user is prompted for the master password whenever it is needed. This provides enhanced security in that unauthorized persons will not be able to access remote sites when client computer system 10 is left unattended with its browser software running.

At step 306, the user navigates through the WWW with the assistance of the browsing software in a manner understood by those of skill in the art. At some point, the user attempts to access a controlled access web site which sends an authentication request to client computer system 10. The authentication request is received at step 308.

Browser programs will generally respond to an authentication request by displaying an authentication form having entry fields for the user's ID and password. However, the password management system intercepts the request and responds to the authentication request at step 310 by inhibiting display of this form. Instead, the password management system attempts to respond to the authentication request automatically.

At step 312, the database of FIG. 2 is scanned for an entry having the URL of the web site sending the authentication request. If an entry is found, the password management system decrypts the password and user ID information using the master password as a key at step 314. If the master password was not entered at step 302 due to the preference setting, the user is prompted for it now. If at step 312, no URL corresponding to the remote server requesting authentication is found, the password management system carries out a series of steps related to registration that are discussed in reference to FIG. 4. At step 316, the password and user ID information are decrypted and at step 314 are sent to the remote site as if this information had been entered in the usual authentication form.

The user now has access to the remote web site. The user is preferably not even made aware of the authentication steps. If the user now selects a second controlled access web site, the process depicted in FIG. 3 repeats.

Figure 4:
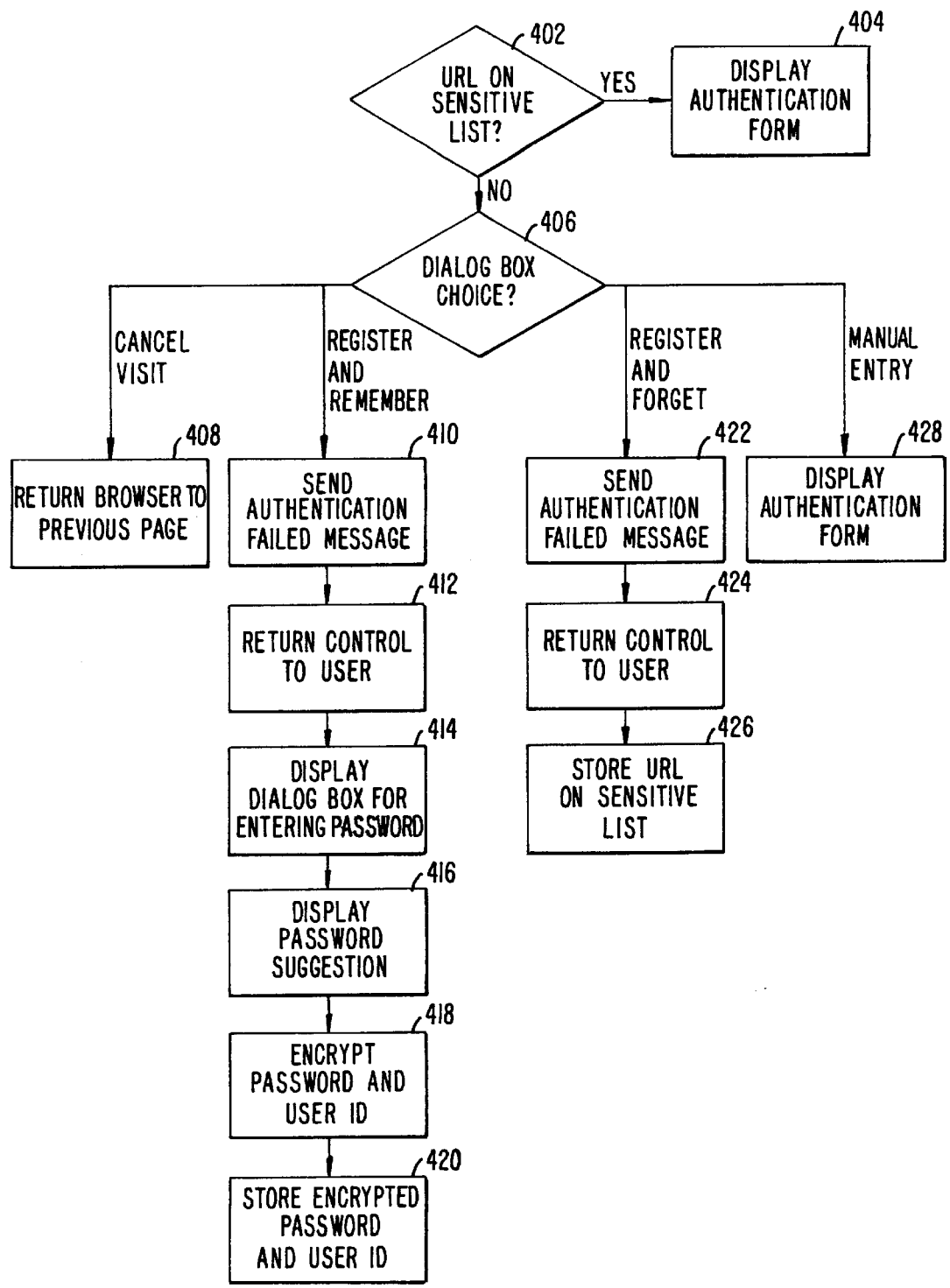
FIG. 4 is a flowchart depicting how a user may be registered to a remote site in accordance with the present invention.

FIG. 4 is a flowchart depicting how a user may register to a remote site in accordance with the present invention. If at step 312, no entry has been discovered corresponding to the URL of the remote web site, the password management system proceeds to step 402 where it checks a list of sensitive URLs for which the user has requested that the password management system remains inactive. If the URL of the web site requesting authentication is on this list, the normal authentication form is displayed for entry of the user ID and password particular to that site at step 404. This allows the user to maintain personal control of password information for particularly sensitive web sites, e.g., bank or mutual fund web sites where he or she feels that even storage of the password in encrypted form does not provide adequate security. Of course, this step of checking against the list could be performed prior to scanning the password database at step 312.

If at step 402 the web site is not found on the sensitive list, execution proceeds to step 406 where the password management system displays a dialog box with various options. Four possible options are:

a) cancel the visit to the site;
b) register with the site and have the password management system remember the user ID and password;
c) register with the site without having the password management system remember the user ID and password; and
d) manual entry of user ID and password.

If the user chooses option a), the password management system directs the browser to return to the previously displayed page at step 408.

If the user chooses option b), the password management system sends an authentication failed message to the remote server requesting authentication at step 410. Then at step 412, control of the browser is returned to the user so that he or she can register. The user will typically be able to navigate to a registration screen where he or she can enter a user ID and password and often other information required for registration. At step 414, the password management system overlays a modeless (the user is free to visit other windows before dismissing the dialog box) dialog box with fields into which the user would input the password and user ID under which he or she is registered to the remote site. Typically, the user will simply cut and paste this information from the remote server site's registration form into the dialog box presented by the password management system. In an alternative embodiment, the password management system automatically intercepts the user's password information as it is input into the registration form. Optionally, at step 416, the password management system generates and displays a suggestion for the password. Such an automatically generated password will typically be less easily guessed and thus more secure than one chosen by the user.

Encryption of the password and user ID using the master password as a key occurs at step 418. If the master password has not been stored previously, the user is prompted for it at this point. Then at step 420, the encrypted password and user ID are stored with the URL of the remote site in the database of FIG. 2.

If the user chooses option c), the password management system sends an authentication failed message to the remote server requesting authentication at step 422. Then at step 424, the password management system returns control to the user for registration at the remote site. Unlike option b), the password management system does not seek to record the user ID and password employed to register. Instead, at step 426, the password management system stores the URL of the remote site requesting authentication on the sensitive list of sites for which the user wishes to maintain personal control of the password information.

If the user chooses option d), the password management system simply displays the usual authentication form at step 428 to allow the user to manually enter a user ID and password.

As can be seen from the above, the present invention provides a convenient system for managing password information for access to multiple controlled access remote servers. The user need only remember a single master password. Since only the master password need be remembered, the passwords particular to specific remote sites may be made more random and thus more secure. Once the master password is entered, the user may seamlessly navigate through controlled access web sites for which the password information is already stored. Implementation of the password management system does not necessarily require modification of any remote servers.

Those of skill in the art will appreciate that the security provided by the password management system is not absolute in that encryption could be overcome and the stored password information discovered. However, typical users are likely to react to the need to remember passwords at multiple sites by either writing the passwords down in a central location or using the same password for each site. The password management system of the present invention provides significant security advantages over either of these "real-world" password management scenarios. Furthermore, the password management system may be implemented so that the user may retain personal control over passwords for particularly sensitive sites.

In the foregoing specification, the invention has been described with reference to specific exemplary embodiments thereof. It will, however, be evident that various modifications and changes may be made thereunto without departing from the broader spirit and scope of the invention as set forth in the appended claims.

The present invention is not limited to the WWW or the Internet. Remote servers could be identified within a password database with identifiers other than their URLs. A database of dial-up bulletin boards could be maintained with telephone numbers identifying each remote server. A mixed database could also be maintained including both web sites and other remote servers requiring passwords for access.

User ID information and password information need not both be encrypted. Furthermore, the system of the present invention is not limited in application to sites that require both a user ID and a password for access.

Furthermore, the flowcharts described herein are illustrative of merely the broad logical flow of steps to achieve a method of the present invention and that steps may be added to, or taken away from, the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java scripting language, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

What is claimed is:

1. In a network, a method of supporting registration of a user of a client system to a remote server comprising:

searching a plurality of network addresses for a remote server requesting authentication;

receiving, at said client system, user input specifying a user ID and a password used to register to said remote server;

encrypting said password using a master password as a key;

storing said password in encrypted form in a database along with a network address of said remote server.

searching a list of sensitive network addresses for said network address; and if said network address is found during said searching, displaying an authentication form.

2. The method of claim 1 wherein said storing further comprises storing said user ID in said database along with said network address and said password in encrypted form.

3. The method of claim 1 further comprising:

encrypting said user ID using said master password as a key; and wherein said storing further comprises storing said user ID in encrypted form in said database along with said network address and said password in encrypted form.

4. The method of claim 1 wherein said network address of said remote server is a URL.

5. The method of claim 1 further comprising:

displaying a dialog box having entry fields for entering said user ID and said password; and wherein said receiving comprises receiving said user ID and said password into said dialog box.

6. The method of claim 5 wherein said displaying further comprises:

generating a suggested password; and displaying said suggested password.

7. Software on a storage medium for, in conjunction with a network, supporting registration of a user of a client system to a remote server, said software comprising:

software for searching a plurality of network addresses for a remote server requesting authentication;

software for receiving, at said client system, user input specifying a user ID and a password used to register to said remote server;

software for encrypting said password using a master password as a key;

software for storing said password in encrypted form in a database along with a network address of said remote server;

software for searching a list of sensitive network addresses for said network address; and software for displaying an authentication form.

8. The software of claim 7 wherein said storing software comprises software for storing said user ID in said database along with said network address and said password in encrypted form.

9. The software of claim 7 further comprising:

software for encrypting said user ID using said master password as a key; and wherein said storing software further comprises software for storing said user ID in encrypted form in said database along with said network address and said password in encrypted form.

10. The software of claim 7 wherein said network address of said remote server is a URL.

11. The software of claim 7 further comprising:

software for displaying a dialog box having entry fields for entering said user ID and said password; and wherein said receiving software comprises software for receiving said user ID and said password into said dialog box.

12. The software of claim 11 wherein said displaying software further comprises:

software for generating a suggested password; and software for displaying said suggested password.

* * * * *